United States Patent [19]
Fima et al.

[11] Patent Number: 5,610,334
[45] Date of Patent: Mar. 11, 1997

[54] MICROGYROMETER

[75] Inventors: Henri Fima, Malissard; Sylvie Pedraza Ramos, Valence, both of France

[73] Assignee: Sextant Avionique, Meudon-la-Foret Cedex, France

[21] Appl. No.: 543,716

[22] Filed: Oct. 16, 1995

[30] Foreign Application Priority Data

Oct. 28, 1994 [FR] France .................. 94 13146

[51] Int. Cl.⁶ .................................................. G01P 9/04
[52] U.S. Cl. ...................... 73/504.12; 73/504.02
[58] Field of Search ...................... 73/504.16, 504.15, 73/504.14, 504.12, 504.04

[56] References Cited

U.S. PATENT DOCUMENTS

| | | | |
|---|---|---|---|
| 5,349,855 | 9/1994 | Bernstein et al. | 73/504.16 |
| 5,359,863 | 11/1994 | Dunn | 73/504.12 |
| 5,377,544 | 1/1995 | Dunn | 73/504.12 |

FOREIGN PATENT DOCUMENTS

| | | |
|---|---|---|
| 0479686 | 4/1992 | European Pat. Off. . |
| 4022464 | 1/1992 | Germany . |

*Primary Examiner*—Christine K. Oda
*Attorney, Agent, or Firm*—Lowe, Price, LeBlanc & Becker

[57] ABSTRACT

A microgyrometer for detecting a rotation about a first direction comprises a plate that is orthogonal to the first direction, suspended to a fixed frame and excited at its resonance frequency along a second direction perpendicular to the first direction. A rotation about the first direction causes the plate to vibrate about a third direction orthogonal to the first two directions. The plate comprises teeth extending respectively along the second and third directions and engaging, without contact, in grooves integral with the frame. Each tooth carries lateral metallizations which constitute capacitors with facing metallizations of the grooves.

6 Claims, 2 Drawing Sheets

MICROGYROMETER

BACKGROUND OF THE INVENTION

1. Field of the Invention

The present invention relates to microgyrometers achieved from a structure vibrating along a first direction.

2. Discussion of the Related Art

The principle on which microgyrometers are based is that, when the structure vibrating along a first direction is rotated about an axis orthogonal to the vibration direction, the vibrating structure tends to generate, due to the effect of the Coriolis acceleration, a vibration along a second direction, orthogonal to the first vibration direction and to the direction of the rotation axis. This induced vibration has an amplitude proportional to the rotation speed about the rotation axis.

It is clear that, to be adequately detected, the induced vibration should have a sufficient amplitude, i.e., the mass moving in vibration must be suspended so as to sufficiently vibrate in its plane along the first direction and along the orthogonal direction where the induced vibration is liable to occur. In addition, to prevent induced vibrations from occurring even in the absence of rotation, the natural resonance frequency along the first direction, at which the first vibration is excited, should be distinct from the natural vibration frequency along the orthogonal direction although these two frequencies should be close so as to obtain a vibration induced at the first frequency along the second direction when rotation occurs.

For the operation of the gyrometer, various actuators and sensors are associated with the vibrating mass preferably in the form of capacitors having one electrode formed on the vibrating mass and another electrode on a facing fixed surface. If x designates the first direction along which a vibration is generated and y designates the second direction along which an induced vibration should be detected, the following elements can be provided:

- a first set of capacitors whose electrode plates are directed orthogonally to direction x, for drawing the vibrating mass in vibration at its natural frequency, (a piezoelectric excitation can also be used),
- a second set of capacitors whose electrode plates are directed orthogonally to direction x, for detecting and servo-controlling the vibration along axis x,
- a third set of capacitors whose electrode plates are directed orthogonally to direction y, for detecting the induced vibration,
- a fourth set of capacitors whose electrode plates are directed orthogonally to direction y, for servo-controlling and canceling an axis shift effect, and
- a fifth set of capacitors whose electrode plates are directed orthogonally to direction y, for ensuring a feedback enlarging the band width and stabilizing the gain.

It should be noted that at least some of these sets of capacitors should have a sufficient surface either to ensure a sufficiently efficient electrostatic excitation or a sufficiently sensitive detection.

SUMMARY OF THE INVENTION

An object of the present invention is to provide a microgyrometer whose structure is selected to achieve in a relatively simple way a desired shift of the resonance frequencies between the vibrations along directions x and y.

A further object of the present invention is to provide such a microgyrometer which enables to achieve in a simple way the various electrode sets such as mentioned above.

To achieve these objects, the present invention provides a microgyrometer to detect a rotation about a first direction which comprises a plate that is orthogonal to the first direction, suspended to a fixed frame and excited at its resonance frequency along a second direction perpendicular to the first direction, a rotation about the first direction causing the plate to vibrate about a third direction orthogonal to the first two directions, in which the plate comprises teeth extending respectively along the second and third directions and engaging, without contact, in grooves integral with the frame, and each tooth carries lateral metallizations which constitute capacitors with facing metallizations of the grooves.

According to an embodiment of the present invention, the capacitors associated with the teeth extending along the third direction constitute first capacitors for exciting in vibration along the second direction, and second capacitors for detecting and controlling the motion along the second direction.

According to an embodiment of the invention, the capacitors associated with the teeth extending along the second direction constitute third capacitors for detecting vibrations along the third direction and fourth correction capacitors.

According to an embodiment of the invention, the vibration plate is connected to the frame through suspensions which constitute narrow areas of this plate.

According to an embodiment of the invention, the teeth and grooves are formed in the central portion of the plate and in a central base integral with the frame.

According to an embodiment of the invention, the teeth are formed at the periphery of the plate and cooperate with grooves that are formed at the inner periphery of the fixed frame.

The foregoing and other objects, features, aspects and advantages of the invention will become apparent from the following detailed description of the present invention when taken in conjunction with the accompanying drawings.

DETAILED DESCRIPTION

The present invention fundamentally provides to achieve the vibrating mass of a microgyrometer as a plate cut out of a larger thin plate of a material such as quartz or silicon.

Figure 1:
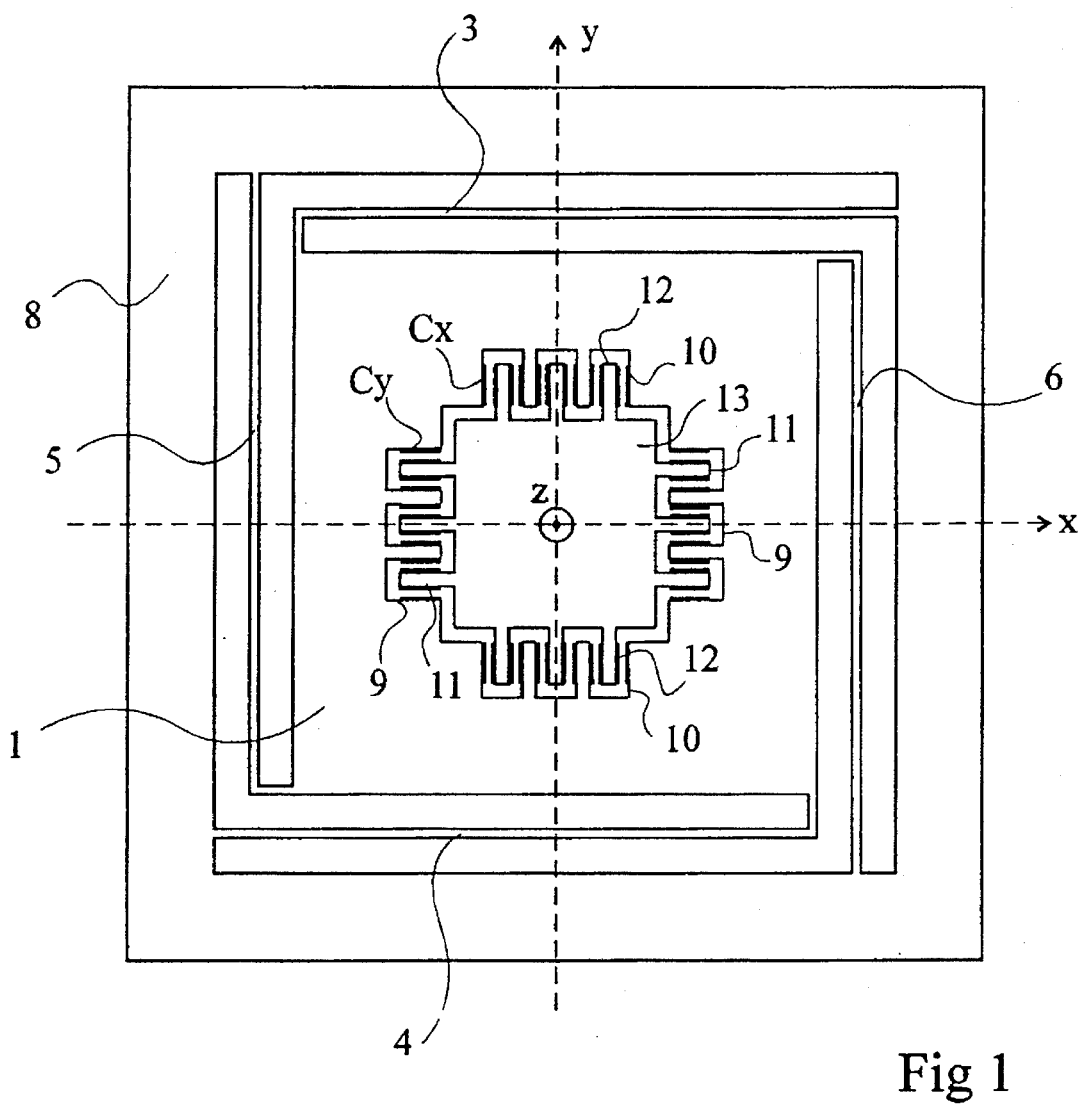
FIG. 1 represents, by way of example, a top view of a simplified embodiment of a microgyrometer according to the invention.

In the embodiment of FIG. 1, the vibrating plate 1 is supported by orthogonal suspension, among which two, 3 and 4, extend along direction x and two others, 5 and 6, extend along direction y. These suspensions connect the vibrating mass 1 to a fixed frame 8. The suspensions are sized to have a high flexibility and to be liable to vibrate in traction-compression mode. Thus, when the vibrating mass is urged along direction x, the suspensions 3 and 4 are excited in traction-compression mode and the suspensions 5 and 6 do not impair the motion. Conversely, for vibrations along direction y, it is the suspensions 5 and 6 that are urged in traction-compression mode.

The middle portion of the vibrating mass 1 is provided with grooves and teeth 9 extending along direction x and with grooves and teeth 10 extending along direction y. Grooves 9 and 10 cooperate with respective grooves 11 and teeth 12 which are integral with a base 13 in turn integral with the fixed frame 8. The facing lateral surfaces of the grooves and the teeth have metallizations which constitute facing electrode plates of the capacitors. Cx designates the capacitors whose electrode plates are orthogonal to axis x, and Cy designates the capacitors whose electrode plates are orthogonal to axis y. Thus, capacitors Cx allow the generation or detection of a motion along axis x and capacitors Cy allow the generation or detection of a motion or a feedback along axis y.

In practice, a very large number of grooves and teeth having a size as small as possible can be provided. Using etching techniques of the type used in the field of semiconductors, from a material such as quartz, teeth can be fabricated having, for example, a length of approximately 0.5 mm, a width of approximately 5 μm and a height corresponding to the thickness of the plate from which the structure is formed, for example, a thickness of approximately 0.3 mm to 0.5 mm. The distance separating the facing surfaces of the teeth can be approximately of a few micrometers, for example 3 μm to 30 μml. Assuming the length of a tooth is 0.5 mm and its thickness 0.3 mm, the surface of each electrode is approximately 0.15 $mm^2$. Therefore for approximately 100 teeth the surface is approximate 100 teeth the surface is approximately 15 $mm^2$.

It is possible to use a large number of teeth for capacitors Cx serving to excite the moving mass along direction x, a smaller number of teeth for the capacitors Cx serving to detect and control along direction x, a large number of teeth for the capacitors Cy serving to detect the induced vibration, and a smaller number of teeth for the capacitors Cy ensuring the various other functions mentioned above.

Such a structure can easily be fabricated with known etching techniques. This structure complies with all the objects desired by the invention since the thin suspensions 3, 4, 5, 6 can, for example, have widths of approximately 10 μm and it is possible to slightly shift the resonance frequencies by providing either one of the pairs of suspensions with a thin layer deposition, for example a metallization, and trimming by laser evaporation.

Figure 2:
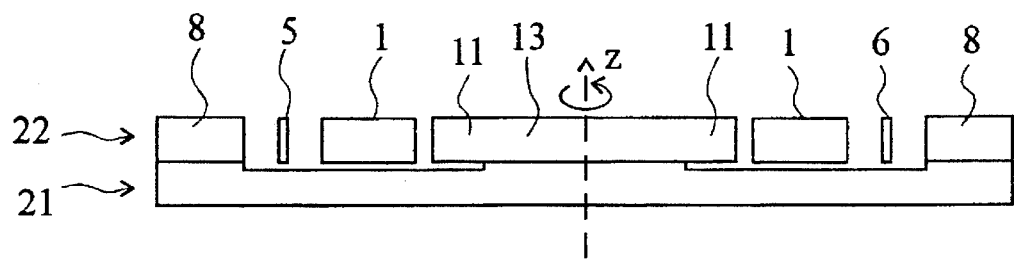
FIG. 2 represents, by way of example, a cross-sectional view of an embodiment of the structure illustrated in the top view of FIG. 1.

FIG. 2 schematically illustrates a specific embodiment of a structure such as that of FIG. 1. This embodiment requires the use of two thin plates 21 and 22, having for example a thickness ranging from 0.3 to 0.5 mm. All the elements represented in the top view of FIG. 1 are formed in the upper plate 22 and these elements are designated with the same references. Since the additional grooves and teeth are etched from the same plate, the above mentioned accuracy can be obtained, assuming that the fixed and moving portions remain associated until a step immediately following the assembly step to the lower plate 21. The lower plate 21 supports the frame 8 and the central base 13 of the structure of FIG. 1.

Those skilled in the art can use various known techniques to achieve the illustrated structure. It should also be noted that instead of assembling two plates, it is possible to use sacrificial layers to provide recesses under the moving mass 1. To form the structure according to the present invention, for example, a silicon monocrystalline or polycrystalline layer formed over a silicon substrate may be used by interposing an insulating layer, for example an oxide layer, which is locally etched beneath locations where the moving mass and the suspensions are formed.

In the above description, it has been assumed that the vibrating mass 1 surrounds a central base 13 and this raises difficulties during fabrication.

Figure 3:
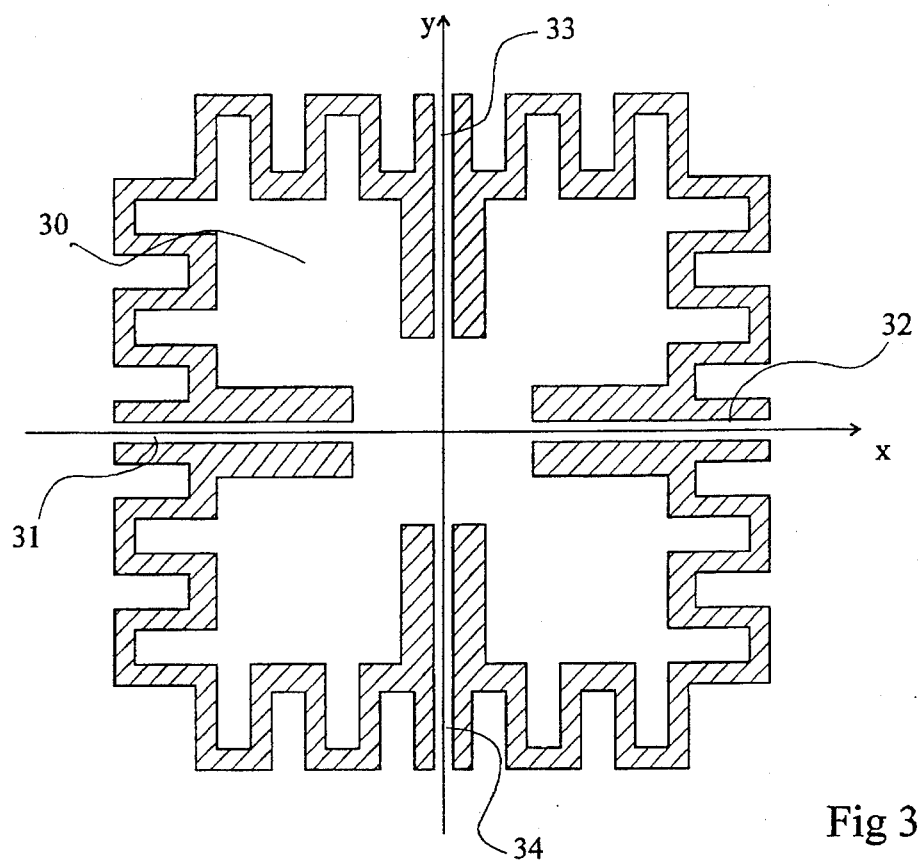
FIGS. 3 and 4 represent two alternative embodiments of the vibrating mass of a microgyrometer according to the present invention.
Figure 4:
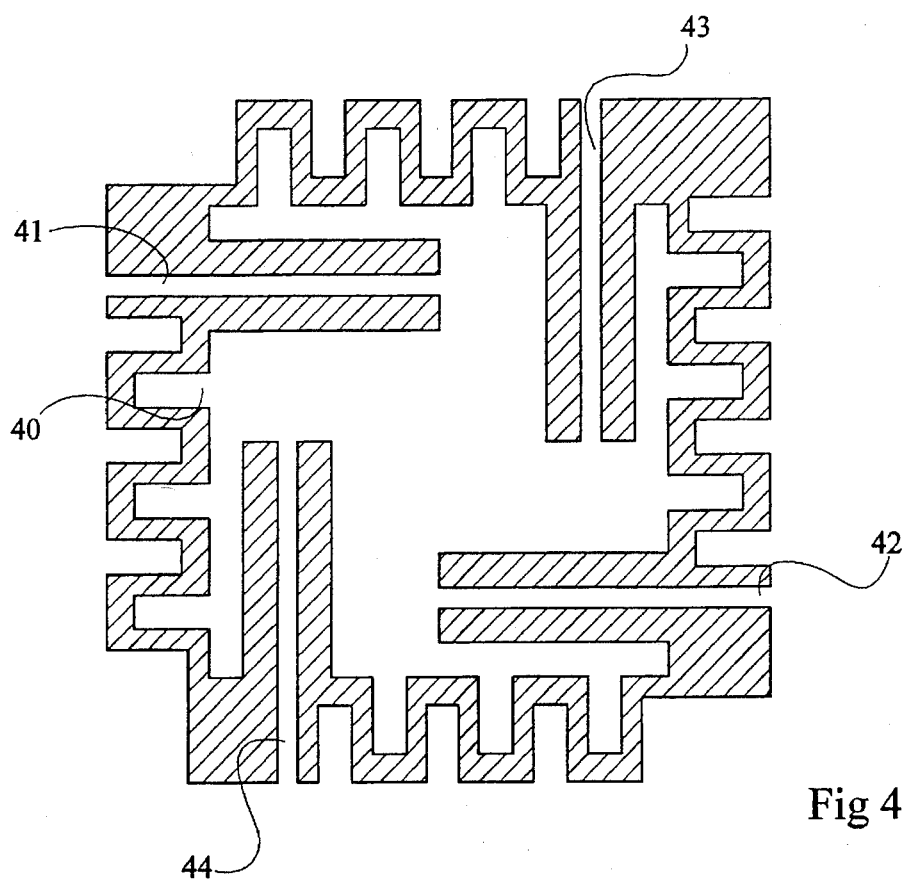

It is also possible, as represented in FIGS. 3 and 4, to devise embodiments in which the vibrating mass is entirely located inside a frame and comprises teeth cooperating with grooves formed in the periphery of the frame.

In FIG. 3, the vibrating mass is referenced 30 and the hatched portions represent recesses between the moving mass and a fixed frame which surrounds it. The moving mass is coupled to the frame through suspensions 31, 32 directed along axis x and suspensions 33, 34 directed along axis y.

The embodiment of FIG. 4 is the same as that of FIG. 3. In this case, the moving mass is coupled to the frame by nonaligned suspensions 41, 42 and 43, 44.

Those skilled in the art will understand that the various illustrated embodiments can be combined. More particularly, shifted suspensions can be used for the embodiment of FIG. 1.

As an example of the dimensions, it is possible to use a square mass of 4 mm sides, a suspension approximately 10 μm thick, and approximately 5 mm long, which provides, for a quartz structure, a resonance frequency of approximately 20 kHz. It should also be noted that the illustrated structure provides a low resonance frequency of approximately 1500 Hz along direction z for a 0.25 mm thick substrate. In addition, still along this direction z, a damping is possible by enclosing the moving mass in a casing, i.e., by making the supporting plate 21 illustrated in FIG. 2 symmetrical and by filling the whole with air to provide a damping which will be more efficient along direction z where the surface is the largest, than along directions x and y.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

We claim:

1. A microgyrometer for detecting a rotation about a first direction (z) comprising a plate (1) that is orthogonal to the first direction, suspended to a fixed frame (8) and excited at the resonance frequency of said plate along a second direction (x) perpendicular to the first direction, a rotation about the first direction causing the plate to vibrate about a third direction (y) orthogonal to the first two directions, wherein;

said plate comprises teeth (9, 10) extending respectively along the second and third directions and engaging, without contact, in grooves (11, 12) integral with said frame, and each one of said teeth carries lateral metallizations which constitute capacitors (Cx, Cy) with facing metallizations of said grooves.

2. The microgyrometer of claim 1, wherein said capacitors (Cx) associated with the teeth extending along the third direction (y) constitute first capacitors for exciting in vibration along the second direction (x) and second capacitors for detecting and controlling the motion along the second direction.

3. The microgyrometer of claim 1, wherein said capacitors (Cy) associated with the teeth extending along the second direction (x) constitute third capacitors for detecting vibrations along the third direction (y) and fourth correction capacitors.

4. The microgyrometer of claim 1, wherein the plate is connected to the frame through suspensions (3–6) which constitute narrow areas of said plate.

5. The microgyrometer of claim 1, wherein said teeth and grooves are formed in the central portion of the plate and in a central base (13) integral with said frame (8).

6. The microgyrometer of claim 1, wherein the teeth are formed at the periphery of the plate and cooperate with grooves that are formed at the inner periphery of the fixed frame.

* * * * *